United States Patent
Gautier et al.

[11] Patent Number: 5,579,675
[45] Date of Patent: Dec. 3, 1996

[54] PNEUMATIC BOOSTER

[75] Inventors: Jean Pierre Gautier; Ulysse Verbo, both of Aulnay-Sous-Bois; Miguel Perez Revilla, Argenteuil, all of France

[73] Assignee: AlliedSignal Europe Services Techniques, Drancy, France

[21] Appl. No.: 117,147

[22] PCT Filed: Aug. 27, 1993

[86] PCT No.: PCT/FR93/00831

§ 371 Date: Sep. 13, 1993

§ 102(e) Date: Sep. 13, 1993

[87] PCT Pub. No.: WO94/06660

PCT Pub. Date: Mar. 31, 1994

[30] Foreign Application Priority Data

Sep. 21, 1992 [FR] France ................................. 92 11224

[51] Int. Cl.⁶ .................................................. F15B 9/10
[52] U.S. Cl. .................................... 91/369.2; 91/376 R
[58] Field of Search ........................... 91/369.1, 369.2, 91/376 R; 92/96, 98 R

[56] References Cited

U.S. PATENT DOCUMENTS

| | | | |
|---|---|---|---|
| 4,598,548 | 7/1986 | Wagner | 91/369.2 X |
| 4,641,568 | 2/1987 | Boehm et al. | 91/376 R X |
| 4,821,623 | 4/1989 | Shinohara | 91/376 R |
| 5,367,941 | 11/1994 | Gautier et al. | 91/369.2 |

FOREIGN PATENT DOCUMENTS

| | | |
|---|---|---|
| 2537524 | 12/1983 | France . |
| 3445118 | 6/1986 | Germany . |

*Primary Examiner*—Hoang Nguyen
*Attorney, Agent, or Firm*—Leo H. McCormick, Jr.

[57] ABSTRACT

A pneumatic brake-booster having a casing with a piston located therein consisting of a hub and a skirt to define a front chamber and a rear chamber. The front chamber is connected permanently to a vacuum source and the rear chamber is connected selectively through a bore in the hub to one of the front chamber and atmosphere by a control valve. The control valve is actuated by a control rod capable of pressing through a front face of a plunger on a back face of a reaction disk fastened securely to a thrust rod. A return spring for the control rod is located between the piston and the plunger. The control valve includes a shutter valve which interacts with a first circular valve seat formed on the plunger and a second circular valve seat formed on the piston. The shutter valve is characterized by a flexible membrane having a first bead fixed in a leaktight manner to a peripheral edge of the hub and a second bead connected in a leaktight manner to an internal peripheral edge of a rigid tubular component. The rigid tubular component is slidably located in a leaktight manner in the bore of the hub and moves to engage the first and second valve seat to control the communication of atmosphere to the rear chamber.

11 Claims, 2 Drawing Sheets

5,579,675

PNEUMATIC BOOSTER

The present invention relates to pneumatic boosters, and more particularly of the type which are used for boosting the braking of motor vehicles.

Boosters of this type conventionally comprise a casing inside which there is a piston formed from a hub and from a skirt to define a front chamber permanently connected to a vacuum source and a back or rear chamber selectively connected to either the front chamber or to the atmosphere by a valve means. The valve means being actuated by a control rod capable of pressing, by means of the front face of a plunger on the back face of a reaction disk securely fastened to a thrust rod. A return spring for the control rod is being arranged between the piston and the plunger. The valve means comprising a shutter interacting with a first circular valve seat formed on the plunger and a second circular valve seat formed on the piston. The shutter is formed from a flexible membrane fixed in a leaktight manner by its outer peripheral edge to the piston.

An example of such booster is illustrated in the document EP-A-0,004,477boosters, exhibit several drawbacks such as the following: in order to prevent the control rod from having too long an idle travel, the valve means must be designed so that the "shutter lift" between the shutter and the first valve seat is as small as possible. It therefore follows that, on braking, the passage offered to the atmospheric air towards the back chamber is reduced, and likewise the passage offered to the air of the back chamber towards the front chamber during brake release is also reduced.

Another drawback due to these reduced and turbulent air passages resides in the fact that the air is greatly slowed down in its various movements between the atmosphere, the back chamber and as a the front chamber, and the boosters have long response times.

In addition, the operation of these boosters can be accompanied by air suction noises, which may become troublesome as the structure of the hub of the piston has a single radial passage towards the back chamber and a single axial passage towards the front chamber may induce a high degree of turbulence in the moving air.

Another major drawback of the known boosters resides in the fact that the annular shutter element has a general frustoconical shape with an external mounting bead, associated with the element support of the shutter, in the tubular hub of the piston assembly. The active part of the shutter element is connected to the mounting bead by a thin web which flaring out towards the outside for its connection with the mounting bead. In such an arrangement, the intermediate web element of the shutter element is subjected to, during the useful life of the booster, to numerous flexural and compressive stresses which can, after a period of time, induce weakening at this point, of the elastomer material making up the shutter element.

In addition, in operation, this intermediate web part of the shutter element is subjected to a pressure differential between the atmosphere prevailing permanently inside the tubular hub, around the input rod, and the vacuum permanently prevailing in the annular chamber surrounding this intermediate web part of the shutter element and permanently connected to the front chamber, or vacuum chamber of the booster. This pressure differential, aside from contributing to fatigue of the intermediate web part, induces an axial force on the active part of the shutter element, which axial force adds to the force of the valve spring. The valve plunger must overcome such axial forces during each brake release phase to free the active part of the shutter element from the first shutter seat formed in the hub and to re-establish communication between the back working chamber of the booster and the vacuum chamber. Because all such forces imposes an oversizing of the return spring for the input rod resulting especially in a high force to be supplied by the driver in order to implement the booster, this force being known in the art by the term "attack force".

Likewise, the plunger has a surface, corresponding to a surface area defined by the first circular valve seat which is subjected to the same pressure differential and an axial force associated with the return spring of the input rod must also overcome to further increasing the attack force.

The brake booster disclosed in document FR-A-2,537,524, broadly recited in the preamble of the main claim herein, attempts to provide a solution to these drawbacks. However such brake boosters still comprises a conventional valve means housed in the tubular central part formed at the back of the casing of the booster which interacting with a modified plunger and have a significant surface area subjected to the pressure differential and therefore requiring a significant attack force. In addition, according to this document, not only must the casing of the booster be of special design, but also the structure of the piston hub has a single radial passage towards the back chamber and a single axial passage towards the front chamber. Communication of air through such passage induces a high degree of turbulence in the moving air, which can be detrimental to the response time of the booster by the slowing down of the air which they impose, and which generate operational noises.

The known boosters thus generally have non-negligible surface areas permanently subjected to a pressure differential which significantly increases attack forces and return forces. In addition, these forces can vary as a function of the difference in the pressures prevailing in the booster. As a result the same booster installed in various vehicles will have different features. Thus, during manufacture, as many booster settings as there will be vehicle models to be equipped are provided, which considerably emburdens the planning of manufacture, storage and dispatch of the boosters. In addition, such a booster will have substantially different features according to whether the vehicle that it equips is at sea level or at high altitude.

The object of the present invention is consequently to provide a booster whose operation is silent, whose response time is as slow as possible, where the valve means do not pose any durability problem and where the attack force is constant regardless of the conditions of use, and can be adjusted practically to any desired value through a simple, reliable and economic fashion using a booster casing of conventional design. The jump of such a booster is adjustable in a simple fashion without removing the booster.

With this object, the subject of the invention is a booster in which the air passages between the atmosphere and the back chamber on the one hand, the back chamber and the front chamber on the other hand, have the greatest possible cross section without presenting obstacles which can generate turbulence, and wherein the valve means and plunger have as reduced as possible a surface area, and even capable of being zero, subjected to the pressure differential.

According to the invention, the flexible membrane forming the shutter is connected in a leaktight manner by its internal peripheral edge to a rigid tubular part sliding in a leaktight manner in a rear tubular part of the piston.

In an advantageous manner, the external diameter of the rigid tubular part of the shutter is substantially equal to the diameter of the first circular valve seat formed on the plunger.

According to equally advantageous features, the plunger is formed with a front tubular part sliding in a leaktight manner in the piston, the external diameter of this tubular front part is substantially equal to the diameter of the first circular valve seat formed on the plunger and the external diameters of the tubular front part of the plunger and of the rigid tubular part of the shutter are substantially equal.

Other features, objects and advantages of the present invention will emerge clearly from the following description of an embodiment of the invention given by way of non-limiting example with reference to the drawings in which:

FIG. 1 represents part of a brake-booster provided to be placed in a conventional manner between the brake pedal of a vehicle and the master cylinder controlling the hydraulic braking circuit of this vehicle. By convention, the part of the booster turned towards the master cylinder is called front, and the part of the booster turned towards the brake pedal is called the back.

Figure 1:
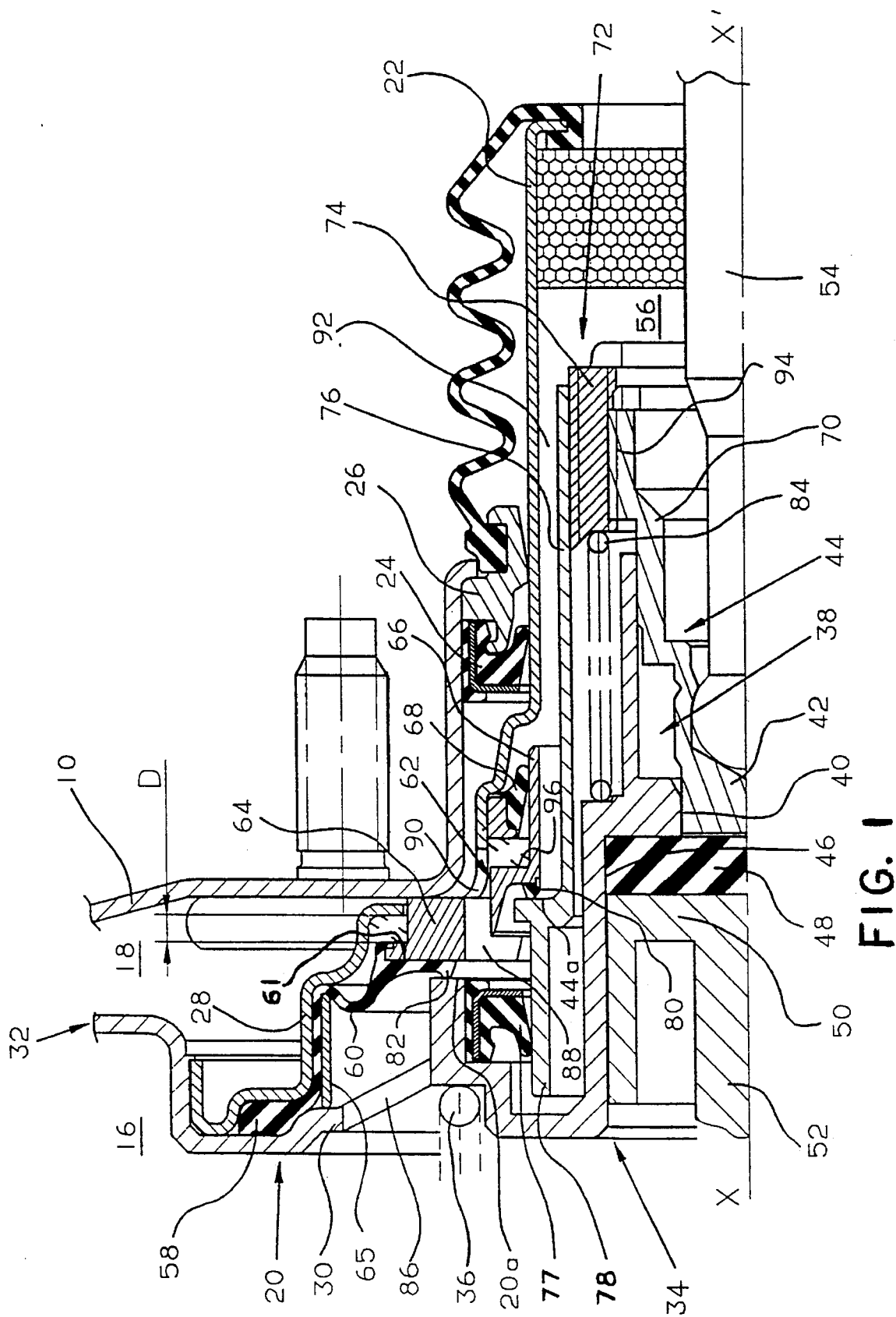
FIG. 1 is a side view, in longitudinal half-section, representing the back central part of a pneumatic brake-booster produced according to the present invention.

The booster of FIG. 1 comprises an outer casing 10 in the form of a shell, having a symmetry of revolution about an axis X–X'. Only the back central part of this casing 10 is represented in the figure.

The inside of the space delimited by the casing 10 is divided into a front chamber 16 or vacuum chamber and a back chamber 18 or working chamber by a piston structure, designated overall by the reference 20. The piston structure 20 interacts with a flexible unrolling membrane made from elastomer (not shown), which is fixed in a leaktight manner by its external peripheral edge to the casing 10, in a conventional manner. The piston 20 comprises a tubular back part 22 which passes through the back wall of the casing 10 in a leaktight manner. The leaktightness of this passage is ensured by a reinforced annular seal 24 which is fixed by a ring 26 into a tubular central part extending the back wall of the casing 10 backwards. The tubular part 22 is terminated towards the front by a part 28 of general approximately frustoconical shape, forming an intermediate piston web.

The front end of larger diameter of the web 28 is securely fastened, for example by force fitting, to a front part 30 of the piston, forming on the one hand a disk-shaped skirt 32, on the external peripheral edge of which the unrolling membrane is fixed, and on the other hand a central hub 34.

A compression spring 36 inserted between the piston 20 and the front wall (not shown) of the casing 10 normally holds the piston 20 in a backwards rest position illustrated in FIG. 1 in which the back chamber 18 has its minimal volume and the front chamber 16 its maximal volume.

The central part of the hub 34 of the piston 20 is cylindrical and is formed with a staged bore 38. An intermediate part 40 of smaller diameter of this bore slideably receives the front end 42 of a plunger 44 also having a symmetry of revolution about the axis X–X', and a front part 46 of greater diameter of this bore receives a reaction disk 48 made from a deformable material such as an elastomer and the back end 50 of a thrust rod 52 intended to actuate a master cylinder (not shown) fixed to the front wall of the casing 10.

The front end of a control rod 54 of the booster, also arranged along the axis X–X', is mounted in the manner of a ball joint in the plunger 44. The back end (not shown) of this rod 54, which projects to the outside of the tubular part 22 of the piston 20, is controlled directly by the brake pedal of the vehicle (not shown).

The annular space 56 delimited between the control rod 54 and the tubular part 22 of the piston 20 opens to the outside atmosphere at the back of the booster, for example by means of an air filter.

Between the skirt 32 and the front end of greater diameter of the web 28 of the piston, a bead 58 forming the front end of a flexible membrane 60 of general frustoconical shape is held in a leaktight manner. The back internal peripheral edge of the membrane 60 is connected in a leaktight manner, for example by bonding, to a component or cylindrical body 62, having a symmetry of revolution with respect to the axis X–X', and produced from a rigid material.

The front part 64 of this component 62 has a plane annular front face 61 perpendicular to the axis X–X', to which the back end of the membrane 60, is fixed so as to stiffen the a shutter element or bead 82.

An annulus 65 is advantageously arranged inside the front end of greater diameter of the web 28 of the piston 20 so as to hold the flexible membrane 60 against the web 28 and to prevent the radial movements of this membrane.

The back part 66 of the rigid component 62 is tubular, and slides in a leaktight manner in the back tubular part 22 of the piston 20 by virtue of a seal 68.

The plunger 44 is formed with the front part 42 already described which interacts with the reaction disk 48, and with a back part 70 sliding in the bore 38 formed in the central part of the hub 34 of the piston 20. The back part 70 of the plunger 44 is formed with an extension 72 extending firstly radially towards the outside so as to form an annular part 74, then from the external peripheral edge of the latter, axially forwards so as to form a tubular part 76.

The front end 78 of the tubular part 76 slides in a leaktight manner inside the hub 34 of the piston 20 by virtue of a seal 77.

The flexible membrane 60, combined with the rigid tubular component 62, forms a three-way valve means and comprises a first circular shutter element 80 formed by an elastic bead arranged on a radial shoulder of the back part 66 of the rigid component 62, and a second circular shutter element 82 formed by an elastic bead on membrane 60 arranged on the plane annular front face 61 of the front part 64 of the rigid component 62. The bead 82 could advantageously, as has been shown, be produced from the same material as the flexible membrane 60. The first shutter element 80 interacts with a first valve seat 44a formed on a radial shoulder of the tubular part 76 of the plunger 44. The second shutter element 82 interacts with a second valve seat 20a formed on a plane annular face directed towards the back of the hub 34 of the piston 20.

Finally, a compression spring 84 is arranged between the hub 34 of the piston 20 and the annular part 74 of the plunger 44 and acts as a return spring for the control rod 54, and openings 86, 88 and 90 are respectively made in the piston 20, the rigid component 62 and the web 28. These openings are evenly distributed around the axis of symmetry of the booster, they are equal in number and have their centers situated in the same plane.

Openings will advantageously be made in the back part 70 of the plunger 44, so as to connect the housings of the spring 84 and of the front end 78 of the plunger 44 with the atmosphere, as far as the seal 77.

The booster illustrated in FIG. 1 is represented in its rest position, in which the piston 20 is brought back into its backwards rest position by the spring 36 acting on the front face of the hub 34. The piston 20 therefore comes into abutment against the bead 82 located on the plane annular front face 61 of the front part 64 of the rigid component 62, which itself comes into abutment against the front face 11 of the back part of the casing 10. The second valve passage 20a-82 between the valve seat 20a of the piston 20 and the shutter element 82 is therefore closed.

The plunger 44 and the control rod 54 are brought back into their backwards rest position by the return spring 84. In this position, the plunger 44 comes into abutment, by means of the shoulder 44a forming the first valve seat, against the bead or shutter element 80 formed on the radial shoulder of the back part 66 of the rigid component 62, itself already in abutment against the front face of the back part of the casing 10. The first valve passage 44a- 80 enters the valve seat 44a of the plunger 44 and the shutter element 80 is itself therefore closed.

The operation of the booster produced in accordance with the invention can easily be deduced from the preceding explanations.

With the booster at rest such as has been represented in FIG. 1, the front chamber 16 is in communication with a vacuum source and is isolated from the back chamber 18 by the valve passages 20a-82 and 44a- 80 which are both closed as has been seen above. An actuation of the control rod 54 has the effect of advancing the plunger 44 against the action of the spring 84. The shutter element or bead 82 remains flattened on the valve seat 20a of the piston 20 under the action of the spring 36, whilst the valve seat 44a starts to move away from the shutter element or bead 80. Air at atmospheric pressure is therefore immediately admitted to the back chamber via the annular space 56, the annular space 92 between the tubular part 76 of the plunger 44 and the tubular part 22 of the piston, the valve passage 44a-80, the openings 88 formed in the rigid cylindrical component 62 and finally the openings 90 in the intermediate web 28.

It can therefore clearly be seen that, in accordance with an objective of the invention, a booster has been produced whose idle travel is as reduced as possible because the only idle travel of the booster of the invention is that which is due to the elasticity of the first shutter element 80 necessary to ensure its leaktightness, but it can be considered as negligible.

It can also be seen that, by virtue of the invention, air is admitted into the back chamber 18 through the valve passage 44a-80 which is of a diameter several times greater than in a conventional booster. Valve passages with a diameter greater than five times the diameter of a conventional valve passage have thus been able to be produced.

It follows, in this example, that the passage cross section offered to the air is also multiplied by five. A booster is developed whose operation is silent because such an enlarged passage cross section allows the air to be communicated to chamber 18 without giving rise to suction noises and other whistlings. It can be appreciated that the value of five is not critical, but has only been chosen as an example.

Any other factor for enlarging the valve passage with respect to a conventional booster can be chosen as function of the desired result.

The booster jump is produced at this operational stage of the booster, the air admitted to the back chamber of the booster creating a pressure difference between the two faces of the piston, generating a boost force which tends to move the piston 20 forwards, this force being transmitted to the thrust rod 52 by the shoulder formed between the two parts 40 and 46 of the stepped bore 38, this shoulder acting on the reaction disk 48. Art abrupt increase of the force exerted by the thrust rod 52 is therefore produced until the reaction disk 48 is sufficiently deformed to fill the space which initially separates its back face from the front face of the plunger 44.

The value of the booster jump is thus set by the axial distance at rest between the front face of the plunger 44 and the back face of the reaction disk 48. By virtue of the particular design of the booster according to the invention, this value can easily be adjusted to any desired value, once the booster is assembled. Indeed, the plunger 44 is produced from two parts screwed into one another, by virtue of a thread 94 between the back part 70 of the plunger 44 and the annular part 74 securely fastened to the tubular part 76 of the plunger 44.

It can easily be understood that, once the booster is totally assembled, as is represented in FIG. 1, a relative rotation of the back part 70 and annular part 74, for example by holding one stationary whilst a rotation about the axis X–X' is imparted to the other with the aid of a suitable tool, is transformed into a translational movement of the front part 42 with respect to the tubular part 76. Since the plunger 44 is at rest bearing on the shutter 80 formed on the rigid component 62 on which the piston 20 also comes to bear so as to close the second valve passage 20a-82, the relative rotation of the rear part 70 and annular part 74 therefore causes the distance between the front face of the plunger 44 and the back face of the reaction disk 48 to vary.

The value of the booster jump according to the invention can therefore be adjusted from the outside, in a simple manner by any suitable process, applied to a totally assembled booster. For example a force corresponding to the desired booster jump could be applied to the thrust rod 52, which brings about a deformation of the reaction disk 48.

It will then be sufficient to screw the back part 70 of the plunger into the tubular part 76 to cause the front face of the plunger 44 to advance until it comes into contact with the deformed part of the back surface of the reaction disk 48, a contact which can be detected by any means, for example with the aid of a strain gauge placed on the control rod 54. Then by releasing the force exerted on the thrust rod 52, a booster will be obtained adjusted to the desired value of the jump. The booster can also be made to operate by actuating it via its control rod 54. Force sensors on the control rod 54 and the thrust rod 52 will make is possible to trace the output force diagram as a function of the input force, and hence to adjust the booster jump to the desired value.

In accordance with another objective of the invention, a booster has therefore indeed been produced whose jump value can be adjusted to any desired value and this being from outside the booster, and therefore without needing to remove it. This booster has an extremely reduced idle travel, and operates without noise.

At the end of the actuation phase which has been described above, air at atmospheric pressure is present in the back chamber 18, and a pressure differential is exerted over the entire surface of the skirt 32, except on the annular surface S lying between the circumference defined by the annulus 65 and the circumference corresponding to the contact of the bead 82 on the seat 20a of the piston 20. The pressure differential is exerted on this surface S of the flexible membrane 60/rigid component 62 forming a shutter assembly.

By judiciously choosing the value of this surface S, as well as that of the stiffness of the spring 84, the piston 20/three-way valve means consisting of shutter 80, cylindrical component 62 and shutter 82 assembly will move under the effect of this pressure differential creating a booster force.

It can therefore be seen that, by virtue of the particular design of the booster according to the invention, the three-way value means consisting of shutter 80, cylindrical component 62 and shutter 82, 60, 62 is only subjected to the single force directed forwards generated by the difference in pressures prevailing in the front chamber 16 and the back chamber 18 of the booster. This difference is in pressure is exerted on the annular surface of the membrane 60 and of the rigid component 62 situated outside the circumference defined by the second bead 82 interacting with the second valve seat 20a formed on the piston 20.

If it is desired to confirm the closure of the valve passage 20a-82, a mechanical force can be added to the pneumatic force described above. Such a mechanical force can be generated by a spring bearing on the piston 20 and stressing the three-way valve means consisting of shutter 80, cylindrical component 62 and shutter 82 forwards. For example, a Belleville washer or a corrugated washer could be used between the seal 68 and the back face 96 of the radial shoulder of the back part 66 of the rigid component 62 on the front face of which the bead 80 is formed, near to the radially internal edge of the opening 90 and/or between the intermediate web 28 and the front part 64 of the rigid cylindrical component 62, near to the radially external edge of the opening 90, as has been shown in dotted lines in FIG. 1.

The movement of the piston 20 and of the shutter 60, 62 as a whole has also had the effect of bringing the bead 80 carried by the rigid component 62 back onto the valve seat 44a of the plunger 44 and thus of closing the valve passage 44a-80. Any subsequent increase in the force exerted by the driver on the control rod 54 will make the valve passage 44a-80 re-open, so as to admit an additional quantity of air at atmospheric pressure into the back chamber 18, has the effect of increasing the boost force exerted on the thrust rod 52 and increasing the reaction to the pedal exerted by the disk 48 on the plunger 44, then in contact with one another.

When the driver of the vehicle wishes to reduce or end a braking action, the input force on the brake pedal is decreased. The control rod 54 reacts to the decrease in input force by retracting to drive the plunger 44, surface 44a of plunger 44 into abutment with bead or shutter 80 to move the three-way value means. This movement then breaks the contact between the bead or shutter element 82 located on face 61 of the rigid cylindrical component 62 and the surface 20a of the piston 20, thus opening the valve passage 20a-82.

The air contained in the back chamber 18 is then sucked into the front chamber 16 by the openings 90 and 88, and the valve passage 20a, 82. In order to allow rapid pressure balancing (in this case vacuum balancing) between the two chambers 16 and 18, the valve passage can open by a relatively significant amount, which is only limited by the distance D between the web 28 and the part of the membrane 60 in front of it.

It can therefore be seen that air flows through the valve passage 20a, 82, which has a diameter distinctly greater than the conventional valve passages, to allow with the aid of a significant passage cross section an equally greater flow rate, from which a reduced response time results in the brake release phase.

Finally, it can be understood that the particular design of the booster according to the invention makes it possible to obtain one of the objectives which had been set.

Indeed, in all the positions of the booster, namely rest, braking or brake release, the three-way valve means is subjected, by its rigid cylindrical component 62, to the difference in pressures being exerted on its surface lying between the bead 80 and the seal 68, its external face being exposed to the pressure prevailing in the back chamber 18, and its internal face being exposed to atmospheric pressure.

Likewise, in all the positions, the plunger 44 is subjected to the difference in pressures being exerted on its surface lying between the bead 80 and the seal 77, its external face being exposed to the pressure prevailing in the back chamber 18 and its internal face being exposed to atmospheric pressure.

It should be understood that if the rigid tubular or cylindrical part 62 of the three-way valve means is given a diameter equal to or substantially equal to that of the bead 80 interacting with the first valve seat 44a formed on the plunger 44, the three-way valve means will not then be subjected to any force generated by a pressure difference. Likewise, by giving the tubular front part 78 of the plunger 44 a diameter equal to or substantially equal to that of the bead or shutter 80 interacting with the first valve seat 44a formed on the plunger 44, the bead or shutter 80 is not subjected to any force generated by a pressure difference.

A very significant feature of the booster according to the invention results therefrom, namely that, regardless of the values of the pressure prevailing in the back chamber 18 and of atmospheric pressure, the atmospheric pressure will create no differential pressure either on the three-way valve means, or on the plunger when the diameters of the plunger 44 is equal to that of bead or shutter 80. In this way the force to be exerted on the plunger to actuate the booster is equal to that which is exerted on it in the brake release phase. Thus a booster is obtained in which, according to the terms used by the person skilled in the art, the attack force is equal to the return force.

It is this feature which makes it possible to very substantially reduce the prestress of the spring 84. Indeed, the the structure of an annular tulip-shaped shutter in conventional boosters implies a "sucked" surface which is distinctly greater in the rest phase than that which exists in the brake release phase. This is why the prestress of the return spring of the input rod must be significant, and this is why the attack force is distinctly greater than the return force. By virtue of the invention, it is now possible to produce a booster where the prestress of the spring 84 can be decreased, with the favorable consequences which result therefrom for the attack force.

Another advantage of the quite specific construction of the booster of the invention will also be noted. Indeed, it can be seen that the spring 84 constitutes the return spring for the control rod 54. In addition, since it is arranged between the plunger 44 and the piston 20, it acts as a shutter spring.

It can hence be seen that the invention makes it possible to reduce the number of components necessary for the operation of the booster. As a result the booster is easier to assemble, and less costly and more reliable.

It can also be conceived that by giving the external diameter of the tubular front part 78 of the plunger 44 a value which is greater or smaller than the diameter of the bead 80 interacting with the first valve seat 44a formed on the plunger 44, it is possible respectively to decrease or increase the attack force, and that likewise by giving the external diameter of the rigid tubular part 62 of the three-way value means, a value which is greater or smaller than the diameter of the bead 80 interacting with the first valve seat 44a formed on the plunger 44, it is likewise possible respectively to decrease or increase the return force.

The attack force necessary for actuating the booster thus appears to be solely set by the prestress of the spring 84 when at rest. It follows that this attack force may be made as low as is wished. It is in this way that boosters have been able to be produced whose attack force is less than 1 kg, whereas a booster of conventional design is characterized by an attack force which is always greater than 5 kg.

It is thus possible, by virtue of the invention, to obtain a booster whose attack force can be adjusted to any desired value, however low this might be. For example, as has been represented in FIG. 1, it can be envisaged to produce the plunger 44 in three parts, the front part 42 and the tubular part 76 already described, and the annular part 74 on which the return spring 84 bears. These three parts are screwed into one another with equal screw pitches.

In this way, once the booster is totally assembled, and the booster jump having been adjusted to the desired value, as has been explained above, by imparting a rotation to the back part 70 of the plunger 44, securely fastened to the front part 42, with respect to the tubular part 76, it is sufficient to impart a rotation to the annular part 74 with respect to the back part 70 and tubular part 76 held stationary with respect to one another, so as to compress the spring 84 to a greater or lesser extent, and thus to adjust the attack force to any desired value.

Figure 2:
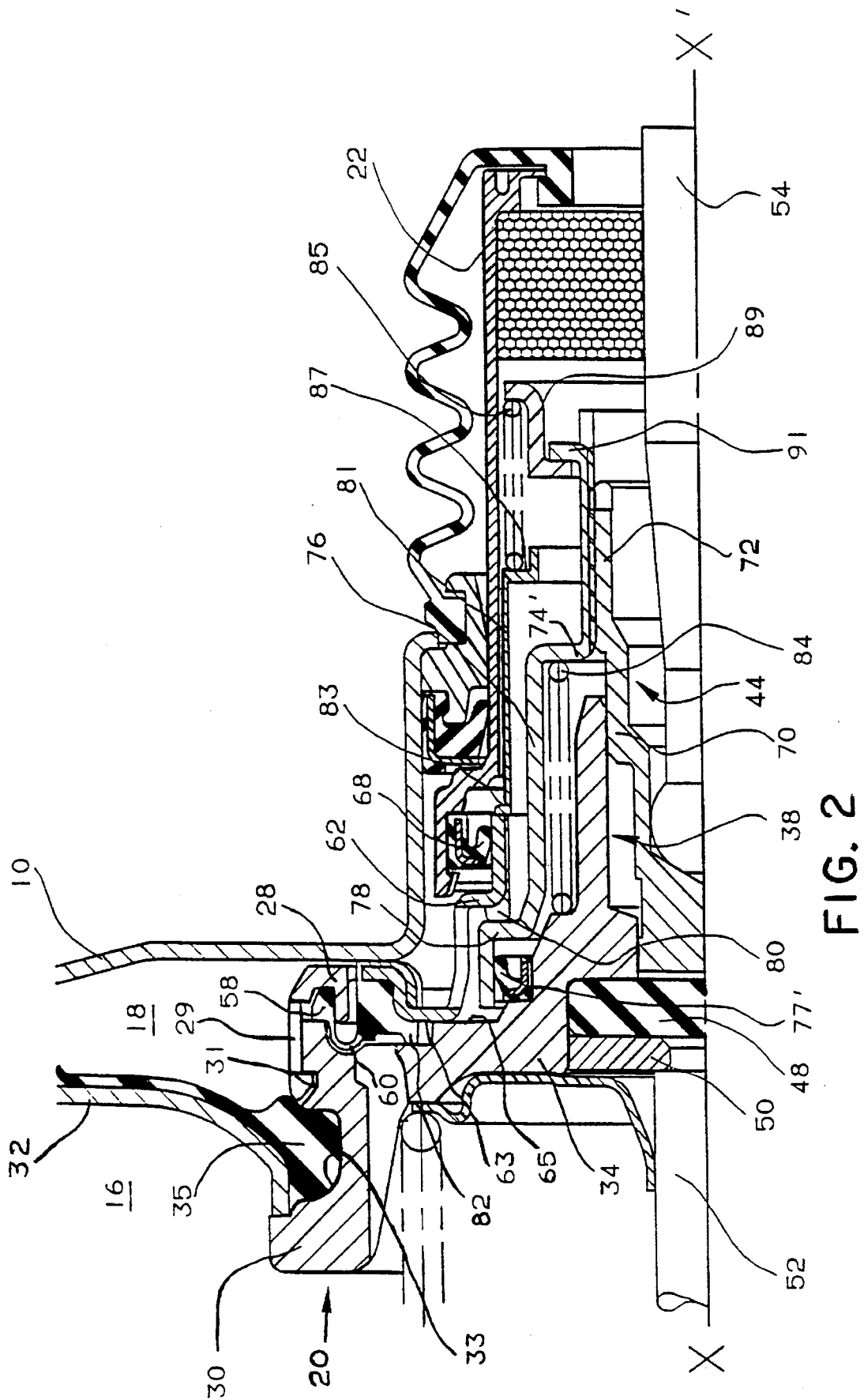
FIG. 2 is a view similar to that of FIG. 1, representing the back central part of a pneumatic brake-booster produced in accordance with a variant of the present invention.

FIG. 2 represents the back central part of a booster produced according to a variant of the embodiment in FIG. 1. In FIG. 2, the elements which are identical or similar to those of FIG. 1 are given the same reference sign, with a "prime" added if necessary.

FIG. 2 shows that the front end of the intermediate piston web 28 is clipped onto the front part 30 of the piston, by virtue of elastic tabs 29 carrying an internal bead interacting with a peripheral groove 31 formed on the piston 20. The front part 30 of the piston includes another peripheral groove 33 which receives the internal peripheral edge of the skirt 32 and the internal bead 35 of the flexible elastomer membrane which advantageously holds the tabs 29 in the groove 31.

The intermediate piston web 28 thus interacts with back face of the front part 30 of the piston 20 in order to hold, in leaktight fashion, the bead 58 of the flexible membrane 60 whose back internal peripheral edge is connected in leaktight fashion to the rigid cylindrical component 62.

The front part 64 of the component 62 has a planar annular front face 63 coming, at rest, into abutment against a planar annular face 65 of the front part 30 of the piston.

The back part 70 of the plunger 44, sliding in the bore 38 of the piston 20, is formed with the back extension 72, integral with the tubular part 76 extending axially forwards, and on which the annular part 74' is formed.

The front end 78 of the tubular part 76 slides in leaktight fashion around the hub 34 of the piston 20 by virtue of a seal 77'.

A sleeve 81 is mounted slidingly in the tubular part 22 of the piston. It has a front end 83 coming, at rest, to bear on the back end of the component 62 under the action of a compression spring 85 which is held between a radial shoulder 87 of the sleeve 81 and a dish 89 bearing on a shoulder 92 formed at the back end of the tubular part 76.

The operation of the booster produced according to this variant conforms totally to the description which has been given above with reference to FIG. 1 and is not resumed in detail. The spring 85 has a prestress at rest and a stiffness which are distinctly lower than those of the spring 84 and has the function of confirming the closure of the valve passage 20*a*-82 during the actuating phase of the booster. The spring 85 therefore has no significant effect on the operation of the booster as described previously.

The idle travel of the booster represented in FIG. 2 is also as small as possible because here again it corresponds solely to the deformation of the first bead shutter element 80.

The jump of the booster represented in FIG. 2 may also be adjusted very simply from the outside after complete assembly of the booster. Indeed, with the aid of a suitable tool, it is possible to immobilize the tubular part 76 rotationally by means of its shoulder 91. It is then possible, with the aid of a second tool, to rotate the back extension 72 of the plunger 44 in order to increase or to decrease the distance, at rest, between the front face of the front part 42 of the plunger 44 and the back face of the reaction disc 48, to increase or decrease the value of the jump of the booster.

The arrangement of the seal 77', according to the variant of FIG. 2, inside the tubular front part 78 of the plunger 44, makes it possible to reduce substantially, with respect to the embodiment of FIG. 1, the surface area of the plunger 44 which is subjected to atmospheric pressure, and therefore correspondingly to decrease the attack force of the booster.

It can be seen that in accordance with the present invention, a pneumatic booster has been produced in which the particular arrangements of the valve seat formed on the plunger 44 possessing a tubular part sliding in a leaktight manner in the piston as well as of the shutter element formed on a rigid part sliding in a leaktight manner in the piston, make it possible for it to operate silently, with very short response times, a reduced attack force and great reliability of the valve means. Of course, the invention is not limited to the embodiment which has been described by way of example, but is capable of receiving numerous variants which will be obvious to the person skilled in the art.

In this way, for example, the invention could be applied to boosters in tandem or with an additional chamber. In this way the tubular part 76 and the annular part 74, 74' of the plunger could also be produced as a single component, and axial openings could be made in the annular part into which openings fingers of a component sliding on the back part 70 of the plunger penetrate, these fingers coming to bear on the spring 84. A nut screwed onto the back part 70 or onto an extension of this part will cause the component provided with fingers to advance or move backwards and will thus cause the stress of the spring 84 when at rest, and consequently the attack force of the booster, to vary.

We claim:

1. A pneumatic brake-booster comprising a casing having a piston located therein with a hub and skirt to define a front chamber which is connected permanently to a vacuum source and a back chamber which is connected selectively through a bore in said hub to one of the front chamber and atmosphere by valve means, said valve means being actuated by a control rod capable of pressing, by means of the front face of a plunger, on a back face of a reaction disk fastened securely to a thrust rod, a return spring for the control rod located between the piston and the plunger, the valve means comprising shutter means interacting with a first circular valve seat formed on the plunger and a second circular valve seat formed on said piston, said shutter means being characterized by a flexible membrane having a first bead fixed in a leaktight manner to a peripheral edge on said hub and a second bead connected in a leaktight manner to an internal peripheral edge of a rigid tubular component, said rigid tubular component being slidably located in a leaktight manner in said bore of said hub.

2. The booster according to claim 1, characterized in that said rigid tubular component of said shutter means has an external diameter substantially equal to a diameter of a first shutter element which interacts with said first circular valve seat formed on said plunger.

3. The booster according to claim 1, characterized in that said plunger includes a front tubular part which interacts by sliding in a leaktight manner within said bore in said piston.

4. The booster according to claim 3, characterized in that said tubular front part of said plunger slides in a leaktight manner in said bore of said piston, said tubular front part of the plunger having an external diameter substantially equal to a diameter of a first shutter element interacting with said first circular valve seat formed on the plunger.

5. The booster according to claim 3, characterized in that said tubular front part of the plunger has an external diameter substantially equal to an external diameter of said rigid tubular part of said shutter means.

6. The booster according to claim 3, characterized in that said tubular front part of the plunger concentrically slides in a leaktight manner around said hub of said piston, said tubular front part of the plunger having an internal diameter substantially equal to said diameter of a first shutter element and interacts with the first circular valve seat formed on said plunger.

7. The booster according to claim 3, characterized in that said tubular front part of the plunger has an internal diameter substantially equal to an external diameter of said rigid tubular part of said shutter means.

8. The booster according to claim 1, characterized in that said plunger comprises a front part with said front face, said front face interacting with said back face of said reaction disk, and a tubular part on which said first circular valve seat is formed, said front part and said tubular part of said plunger being capable of moving axially with respect to one another.

9. The booster according to claim 8, characterized in that said plunger comprises an annular part for retaining said return spring for the control rod, said annular part being capable of moving axially with respect to said front part.

10. The booster according to claim 9, characterized in that said annular part of said plunger is also capable of moving axially with respect to said tubular part of said plunger.

11. The booster according to claim 1, characterized in that said shutter means is subjected only to a single force directed forwardly and generated by a difference in pressures prevailing in said front and back chambers of the booster, said single force exerted on a surface lying between the outer peripheral edge of said flexible membrane and a part interacting with said second valve seat formed on said piston.

* * * * *